United States Patent Office 2,695,855
Patented Nov. 30, 1954

2,695,855

FIBROUS MAT

Joseph F. Stephens, Kansas City, Mo., assignor to Gustin-Bacon Manufacturing Company, a corporation of Missouri No Drawing. Application November 23, 1949, Serial No. 129,167

4 Claims. (Cl. 154—54)

This invention relates to an improvement in acoustical and heat insulating bonded mats or felts used as thermal or acoustical insulating material and refers more particularly to a felted fibrous structure into which is incorporated a rubber-like elastic material in combination with a thermoplastic or thermosetting resinous material. The fibers and the elastic material are bonded together by the resinous material, and the mat or felt is manufactured in a continuous operation by depositing the fibers, elastic material, and binder upon a conveyor where a mat is formed by flowing and hardening or curing the resinous binder material through the application of heat.

A mat having the structure contemplated has improved characteristics over material now employed for the purpose, is economical to manufacture, has extensive uses as thermal or acoustical insulation and as padding or upholstering material. For example, in the modern automobile it may be used in the dash panel for the purpose of insulating against both the heat and sound of the engine; it may be used as a sound and heat insulation under the rubber floor mats, as a top liner for sound absorption, for lining air intake ducts, and in the fabrication of shroud sides.

An object of the invention is to provide a mat structure which is effective as a heat and sound insulating material which possesses unusual properties of resilience and which has a high degree of integrity or strength.

Another object is to provide a mat in which are incorporated carrier and filler fibers of organic or inorganic nature or a mixture of the two in combination with an elastic material and bonded with a thermoplastic or thermosetting resin into a resilient pad which is easily shaped and sufficiently flexible to fit irregular surfaces.

A further object is to provide a felted structure which is economical to manufacture and effective in meeting the requirements for which it is utilized.

In the manufacture of this material from organic or inorganic fibers or a combination of the two, the fibers or filaments are first prepared by chopping or cutting to the desired length, if they are not of the proper length as supplied. Selected quantities and types of fibers are then appropriately blended, the blend consisting in some part of longer length carrier fibers and in greater part of shorter length filler fibers.

The reason for using carrier fibers and filler fibers in the blend is that in order to make use of the cheaper filler fibers, it is necessary to blend therewith a sufficient percentage of the longer carrier fiber to have the blend or mixture successfully carry through textile equipment such as garnetts. If all short filler fibers are too high a percentage thereof are utilized, the result is the loss of an objectionable amount in the form of droppings in the Garnett operation. These longer carrier fibers are also used to impart strength to the finished product.

The blend of carrier and filler fibers is fed to a hopper type Garnett feeder, then processed through the Garnett, from the final cylinder of which it is stripped off by a doffer roll. The doffer roll is in turn stripped of the fibers by a brush roll, which is in turn stripped by a beater or wind roll or by an air stream which propels the fibers forward from the Garnett. A suitable form of apparatus for doing this is disclosed in Hubert O. Sheidley application Serial No. 210,544, filed February 12, 1951, now Patent No. 2,619,151.

The fibers are carried by the air stream into a hood or settling chamber, which is open on the side from which the fibers are fed and closed on all other sides except the bottom which is comprised of a foraminous conveyor belt positioned over a vacuum box. A partial vacuum is pulled through the foraminous belt causing the fibers to be attracted to and to lay up on the upper face of the foraminous belt in the form of a mat or felt as the belt moves through the hood. The vacuum also serves to exhaust the air which transports the fiber into the hood. Suction from the foraminous belt builds up the fibers in the form of a felted mat on the surface of the moving belt conveyor. This arrangement also is shown in the aforementioned Sheidley application.

According to the present invention, in the vicinity of the Garnett stripping mechanism (which comprises the brush and beater rolls previously mentioned) and between the Garnett and the foraminous belt, a powdered thermosetting or thermoplastic resin is introduced by feeding the resin into a separate air stream and merging such air stream with the air stream which is transporting the fibers. With such powdered thermosetting or thermoplastic resin, there is mixed a desirable proportion of powdered rubber, either in the vulcanized or unvulcanized state, so that there is airborne into the hood or settling chamber and deposited on the foraminous belt, a combination of fibers, powdered resin, and powdered elastic material, the powdered material being intimately interspersed throughout the felted web.

Instead of the airborne powder resin, a wet spray may be used in which the resin is in the form of either a solution or dispersion and to which rubber has been added in the form of a rubber latex or solution. In such use the wet resin and rubber is sprayed into the air stream carrying the fibers, thus coating and intimately comingling with the fibers prior to their deposition and accumulation on the conveyor belt.

It is also contemplated that the rubber may be added in the form of a rubber latex or solution to the fiber and dried on the surface of the fiber before such fiber is fed to the Garnett. In such case only the thermosetting or thermoplastic resin is introduced in dry or wet state between the Garnett and the foraminous belt upon which the mat is formed.

In place of incorporating powdered rubber or of pre-treating the fiber with rubber, fiber or fiber threads which contain such rubber on the surface or interspersed throughout the mass in small discrete particles or both may be utilized. An example of such fiber is that which is reclaimed from the carcass of automotive tires, which fibers have been reclaimed therefrom through special reclaiming methods, removing the cord from the rubber tire body in a form known to the trade as "reclaimed tire cord." Within the fibers composing such cord and on the surface thereof is to be found the requisite rubber for the product described without further processing thereof or without adding additional rubber.

After the carrier and filler fibers have been combined with the elastic material and resinous binder and the composition deposited in the form of a mat structure on the conveyor belt, the mat or felt moves thereon to a point of transfer to a steel flight conveyor, which passes through a curing or drying oven. Such oven conveyor has positioned thereabove a second conveyor also passing through the oven, the flights of which are in a parallel plane to those of the conveyor on which the mat is carried. The oven conveyors are adjustable with respect to each other so the space between their flights may be varied to govern and control the thickness and density of the mat. In other words, by regulating the distance between the flights of the respective conveyors, it is possible to compress the mat structure to any desired degree during the period it is in a formative state or while in transit through the oven.

In the oven the mat is exposed to sufficient heat, when a thermoplastic binder is used, to cause it to soften and flow. When a thermosetting binder is employed, the heat of the oven is regulated to cure the binder during its passage through the oven to a degree that the fibers of the mat are bonded into an integral structure. Methods of oven drying and curing thermoplastic and thermosetting binders are well known to the art.

In order to produce the desired properties in the resultant composition or felted mat, it is necessary that the elastic material, rubber or an equivalent elastomer, be used in combination with a thermoplastic or thermosetting resin or binder. The product is characterized by better adhesion between the carrier and filler fibers composing the mat and by a marked increase in its resilient properties.

Examples of fibers or filaments adaptable as carrier fibers are long staple cotton, cotton clearer waste (a form of mill waste obtained as a waste material in clearing or cleaning carding machines in the processing of long staple cotton), rayon, nylon, or other synthetic fiber, filaments, yarns, or threads, chopped or cut to the desired length, cotton yarns or threads obtained by opening and chopping, cotton garment cloth such as garment clips or thread waste having the requisite length of filament or thread. This carrier fiber or thread stock is characterized by lengths ranging predominately between ¾" to 3", although a small percentage of shorter material may be present, as the necessary consequence of methods used to cut or chop the fiber to the desired lengths.

Examples of the filler fiber are cotton linters, cotton napper (recovered from napping operation in the manufacture of cotton blankets and the like) and reclaimed tire cord. The fill fiber is characterized by lengths predominately less than ¾".

In composing a blend or mixture to form the mat, a minimum of 25% carrier fiber is used with a maximum of 75% fill fiber and a minimum of 10% of total binder material by weight is utilized, of which not less than one-third is of the rubber or elastomer type.

Four of the most successful mats or felts are processed from blends of the recited materials in the proportions indicated in the following examples:

*Example I*

60 lbs. of reclaimed tire cord having a percentage of vulcanized rubber of not less than 10% nor more than 30%, making a composition of 70% to 90% of cotton and 10% to 30% of rubber.
40 lbs. long staple cotton in the form of clearer waste.
20 lbs. powdered phenol formaldehyde resin.

*Example II*

60 lbs. reclaimed tire cord as in Example I.
20 lbs. long staple clearer waste.
20 lbs. of chopped or cut rayon filament or thread stock 1½" average length.
20 lbs. powdered phenol formaldehyde resin.

*Example III*

50 lbs. cotton napper.
40 lbs. chopped or cut cotton or rayon thread stock or rayon filament of an average length of 1½" and ranging in length from ¾" to 3".
10 lbs. powdered natural or synthetic rubber, or 10 lbs. of rubber solids in the form of a sprayed emulsion.
20 lbs. of vinyl chloride acetate resin, or 20 lbs. of the same resin in the form of solids in a solution or dispersion.

*Example IV*

50 lbs. cotton napper or cotton linters.
30 lbs. glass filament or glass yarn chopped to an average length of 1½".
20 lbs. phenol formaldehyde resin.
10 lbs. powdered natural or synthetic rubber, or 10 lbs. rubber solids in the form of a sprayed emulsion.

In the processing of the material in the forming section or hood where the fibers, rubber, and binder are combined, and in the heating of the material in the oven, some part of the binder material contained in the blend is necessarily lost to the vacuum and in the form of volatiles which are discharged through the stack.

Typical compositions of finished products contemplated herein and as manufactured are as follows:

|  | Per cent |
|---|---|
| 1. Organic fiber (cotton, rayon, nylon, wool, etc.) | 56 to 89 |
| Synthetic resin (thermoplastic or thermosetting) | 8 to 24 |
| Rubber (natural or synthetic rubber or equivalent elastomer) | 3 to 20 |
| 2. Organic fiber (cotton, rayon, nylon, wool, etc.) | 21 to 46 |
| Mineral carrier fiber (glass filament or glass yarn cut or chopped to an average length of 1½" with lengths ranging from ¼" to 3") | 10 to 35 |
| Thermoplastic or thermosetting synthetic resins | 8 to 24 |
| Natural or synthetic rubber or equivalent elastomer | 3 to 20 |

The upper part of the range of resin and rubber content is utilized in fiber blends which contain high percentages of filler fiber and the lower part of the range of resin and rubber content is used with blends which contain the higher percentage of carrier fiber.

Thus it will be seen that there has been produced a mat or felted structure of fibers intimately combined with an elastic material and a resinous binder to produce an integral insulating pad. This mat or pad is bonded into a rugged, resilient composition economically manufactured from principally waste material at a low cost and effective for innumerable uses to insulate against heat, sound and like purposes.

From the foregoing it will be seen that this invention is one well adapted to attain all of the ends and objectives hereinabove set forth, together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

In the appended claims the term "rubber-like elastic material" should be understood as meaning materials or mixtures of materials characterized by the properties of rubberiness and elasticity manifest by natural rubber; the term thus embraces natural rubber and also lastics (e. g., synthetic rubber) which are usable in lieu of, or in combination with, natural rubber and exhibit like characteristics when so used.

Having thus described my invention, I claim:

1. A fibrous mat composed of a heterogeneous mixture of organic carrier fibers and fill fibers, said carrier fibers being predominately of a length between 0.75 inch and 3 inches and comprising 25% to 50% of the mixture, said fill fibers being predominately of a length less than 0.75 inch and comprising 50% to 75% of the mixture, the fibers being bonded together at their intersections by a resinous binder to form an open skeleton-like network honeycombed throughout with interstitial air spaces, and a rubber material distributed throughout said network and bonded thereto, the quantity of said rubber material being insufficient to fill said air spaces and comprising 3% to 20% by weight of the mat, said rubber material serving to yieldably resist compressive deflection of the fiber network.

2. A fibrous mat as in claim 1 wherein said rubber material is distributed in discrete particles throughout said network.

3. A fibrous mat as in claim 1 wherein at least a portion of said fibers are coated with said rubber material.

4. A fibrous mat as in claim 1 wherein at least a portion of said fibers have said rubber material imbedded therein.

References Cited in the file of this patent

UNITED STATES PATENTS

| Number | Name | Date |
|---|---|---|
| 1,200,692 | Baekeland | Oct. 10, 1916 |
| 1,365,878 | Weiss | Jan. 18, 1921 |

(Other references on following page)

UNITED STATES PATENTS

| Number | Name | Date |
|---|---|---|
| 1,517,221 | Mead et al. | Nov. 25, 1924 |
| 1,765,026 | Miller | June 17, 1930 |
| 1,961,272 | Williams | June 5, 1934 |
| 1,978,385 | Neiley | Oct. 23, 1934 |
| 2,060,253 | Shopneck | Nov. 10, 1936 |
| 2,087,441 | Metcalf et al. | July 20, 1937 |
| 2,277,049 | Reed | Mar. 24, 1942 |
| 2,288,095 | Lindsay et al. | June 30, 1942 |
| 2,331,146 | Slayter | Oct. 5, 1943 |
| 2,336,797 | Maxwell | Dec. 14, 1943 |
| 2,477,675 | Wilson et al. | Aug. 2, 1949 |
| 2,489,079 | Clark et al. | Nov. 22, 1949 |
| 2,543,101 | Francis | Feb. 27, 1951 |
| 2,546,266 | Kropp | Mar. 27, 1951 |
| 2,550,465 | Gorski | Apr. 24, 1951 |
| 2,571,335 | Browne | Oct. 16, 1951 |
| 2,574,849 | Talalay | Nov. 13, 1951 |

FOREIGN PATENTS

| Number | Country | Date |
|---|---|---|
| 402,042 | Great Britain | Apr. 5, 1934 |